March 10, 1942.  P. A. CHECK  2,275,841

CLAMP FOR JUNCTION BOXES

Filed Jan. 3, 1941

Inventor:
Paul A. Check,
by Harry E. Dunham
His Attorney.

Patented Mar. 10, 1942

2,275,841

UNITED STATES PATENT OFFICE 2,275,841

CLAMP FOR JUNCTION BOXES

Paul A. Check, Trumbull, Conn., assignor to General Electric Company, a corporation of New York Application January 3, 1941, Serial No. 373,020

2 Claims. (Cl. 285—24.5)

My invention relates to cable clamps, and more particularly to clamps for use with electrical junction boxes such as are used in commercial and residential wiring systems.

An object of my invention is the provision of a cable clamp of the type described which is so constructed and arranged that it may be readily adjusted within the junction box to accommodate various sizes of cable.

Another object of my invention is the provision of a cable clamp for use in junction boxes in which the number of parts of the cable clamp has been reduced and which is so constructed and arranged that it may be easily and quickly assembled within the junction box.

Figure 1:
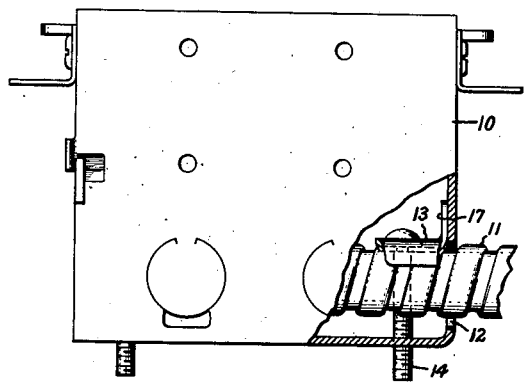
Figure 2:
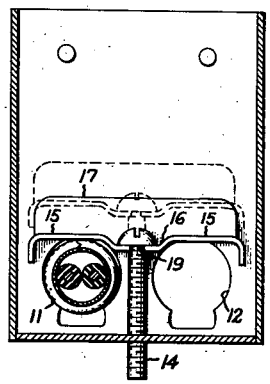
Figure 3:
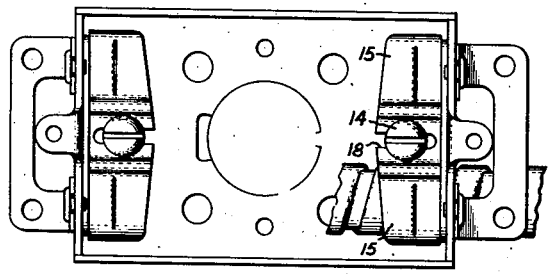
Figure 4:
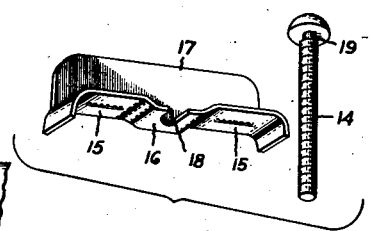
Figure 5:
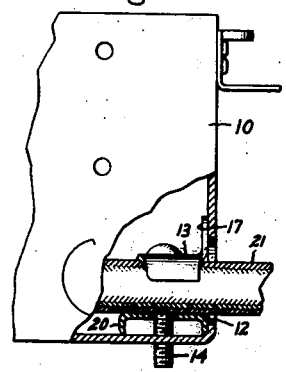

In the accompanying drawing Fig. 1 is a view showing my cable clamp mounted in cable clamping position in a junction box; Fig. 2 is an end view of the clamp shown by Fig. 1; Fig. 3 is a top plan view of my cable clamp mounted in a junction box; Fig. 4 is a perspective view of the clamp and adjusting screw, and Fig. 5 is a view of a modified form of cable clamp.

When junction boxes, for example wall boxes, are supplied for use in wiring systems, they are usually provided with cable clamps mounted in the box which are adapted to clamp the cables forming part of the system, wired into the box. Examples of such cables are the conventional spirally armored cable and the non-metallic sheathed cable provided with an outer flame-retarding and moisture-resisting braid. In wiring, the cable is inserted through an opening formed by removing a knockout in the wall box and is then clamped to the box by means of the cable clamp. Usually cable clamps are provided at opposite ends or sides of the box. Cable clamps of this type ordinarily comprise a bearing plate which is forced into engagement with the cable by means of a screw threaded through the bottom wall of the wall box. In the case of armored cable, the cable is simply clamped between the bearing plate of the clamp and the lower side of the opening formed by the knockout, as shown by Fig. 1. In the case of non-metallic sheathed cable a separate lower bearing plate is provided to cooperate with the upper bearing plate of the clamp so that the cable is clamped between the two bearing plates and does not rest on the sharp edge of the opening formed by the knockout, this arrangement being shown by Fig. 5. Both forms of clamps are supplied to the user already installed in the wall box by partial threading of the clamping screw.

Since the bearing plate is ordinarily loosely mounted on the locking screw, in the assembling operation the clamp cannot be adjusted in position in the box to receive the cable because the plate simply falls to the bottom of the box. Thus it is necessary to adjust the bearing plate within the box by lifting it off the bottom of the box to accommodate the associated cable inserted through the opening in the wall of the box when an installation is being made. Unless some provision is made to maintain the bearing plate spaced from the bottom of the box, it is necessary to grip the plate with one hand to move it up out of the way of the opening to permit insertion of the cable within the wall box. Adjustment of the cable clamp is sometimes a vexatious and troublesome operation, particularly if the box is already filled with conductors making it difficult for the electrician to grasp the clamp with his fingers. To overcome these objections various expedients have been used to maintain the bearing plate spaced from the bottom of the box. For example, a coil spring has been inserted between the bottom of the box and the clamping plate surrounding the clamping screw and, in some instances, collapsible tubes have been employed to separate the clamping elements. In both cases the spacing elements are readily deformed upon tightening of the clamp to permit it to engage the cable. However, these devices have the objection that they increase the cost of the clamp by the provision of an additional part and the cost of assembling the clamp in the wall box is increased due to the necessity of handling an additional part. Moreover, additional room is taken up in the box which would otherwise be available for accommodating the wires of the cables. According to my invention these deficiencies are overcome by the use of a new and improved construction which makes possible adjustment of the clamp at the time of assembly without the necessity of additional parts and without taking up additional space within the box.

Referring to the drawing, Fig. 1 shows a junction box 10 which in this case is illustrated as a conventional switch or wall box adapted to receive a spirally armored cable 11 through an opening 12 formed by removal of one of the knockouts of the box. The cable is clamped in position against the lower edge of the opening 12 by means of a clamping plate 13 forced down into engagement with the cable by means of an operating screw 14 threaded through the bottom of the box. The clamping plate is provided with opposite bearing surfaces 15 having turned down edges for gripping one or two cables inserted through adjacent openings in the end wall of the box. The bearing surfaces are separated by a depressed portion 16 for receiving the locking screw 14. A closure flange 17 extends at right angles to the bearing surfaces 15 and forms a closure for the openings 12 as the clamping member is forced downwardly into engagement with the cables in case the cables are not large enough to completely fill the openings 12. The clamp thus far described is similar to those already in common use. According to my invention, however, the clamping plate and locking screw are so arranged that the plate is supported on the locking screw in spaced relation to the bottom of the box so that a cable may be readily inserted through a knockout without previous adjustment of the clamp.

To this end, the central depressed portion of the clamping member is provided with a transverse slot or groove 18 which cooperates with and receives a reduced neck portion 19 formed on the upper end of the locking screw 14 between the head and the threaded portion thereof. This means that the locking screw and clamping member may be mounted together in assembled relationship in the box simply by inserting the reduced neck portion of the screw in the slot 18 and then threading the screw into the bottom of the box a small distance. It will be apparent that this is a very simple assembling operation since only two parts need be handled.

After assembly the clamping member cannot become dislodged from engagement with the locking screw because the upstanding flange 17 bears against the side wall of the wall box and prevents the clamping member from moving laterally out of engagement with the locking screw. The clamping member cannot drop downwardly out of engagement with the locking screw, inasmuch as the close fitting engagement of the reduced neck portion 19 along with the slot 18 prevents the clamping member from moving along the locking screw 14.

In clamping a cable the clamping member is adjusted to make room for the cable by simply unthreading or threading the screw 14 to move the clamping member upwardly or downwardly. No separate biasing means is necessary to maintain the clamping member spaced from the bottom of the box such as would be necessary if the screw 14 were simply passed loosely through an opening in the clamping member. Adjustment of the clamp is effected by means of a screw driver making it unnecessary for the electrician to grasp the clamp by the hand to lift it from the bottom of the box. This greatly simplifies wiring of the cable, particularly if the box is already substantially full of wires since it is easy to insert the screw driver into engagement with the locking screw without disturbing the arrangement of the wires in the box.

In Fig. 5 I have shown my invention applied to a clamp adapted for use with non-metallic sheathed cable. To this end, a separate bearing member 20 is inserted between the clamping member 13 and the bottom of the box 10 so that the non-metallic sheathed cable 21 rests on the bearing member instead of the sharp edge of the opening formed by punching out one of the knockouts. The bearing member 20 is loosely mounted on the locking screw 14 so that it normally rests on the bottom of the box. Rotation of the locking screw will then move the upper clamping member into and out of clamping relationship with the lower bearing member. The construction of the clamping member and locking screw is the same as that shown by Figs. 1 to 4, inclusive.

What I claim as new and desire to secure by Letters Patent of the United States, is:

1. A clamping device for use in an electrical junction box comprising, in combination, a clamping member having a bearing surface adapted to engage an electric cable, said clamping member being provided with an open-ended lateral slot extending from one edge thereof, a locking screw, said locking screw being movable laterally into said open-ended slot and having portions cooperating with said clamping member and other portions adapted to be seated within said slot whereby longitudinal movement between the screw and clamping member is prevented, said locking screw being threaded into one wall of the junction box, the other edge of said clamping member cooperating with another wall of the junction box to prevent disengagement of the clamping member and screw by lateral movement of said screw out of said slot after assembly of the screw and clamping member in the junction box, said clamping member being movable into and out of engagement with the cable upon rotation of said locking screw.

2. A clamping device for use in an electrical junction box comprising, in combination, a clamping member having a bearing surface adapted to engage an electric cable, said clamping member being provided with an open-ended lateral slot extending from one edge thereof, a locking screw, said locking screw being movable laterally into said open-ended slot and having a reduced neck portion seated in said lateral slot to prevent longitudinal movement between the screw and clamping member, said locking screw being threaded into one wall of the junction box, the other edge of said clamping member cooperating with another wall of the junction box to prevent disengagement of the clamping member and screw by lateral movement of said screw out of said slot after assembly of the screw and clamping member in the junction box, said clamping member being movable into and out of engagement with the cable upon rotation of said locking screw.

PAUL A. CHECK.